May 14, 1929.  E. HUTCHENS  1,712,618
CLINCHER TIRE BEAD FLIPPING MACHINE
Original Filed Dec. 5, 1924    4 Sheets-Sheet 1
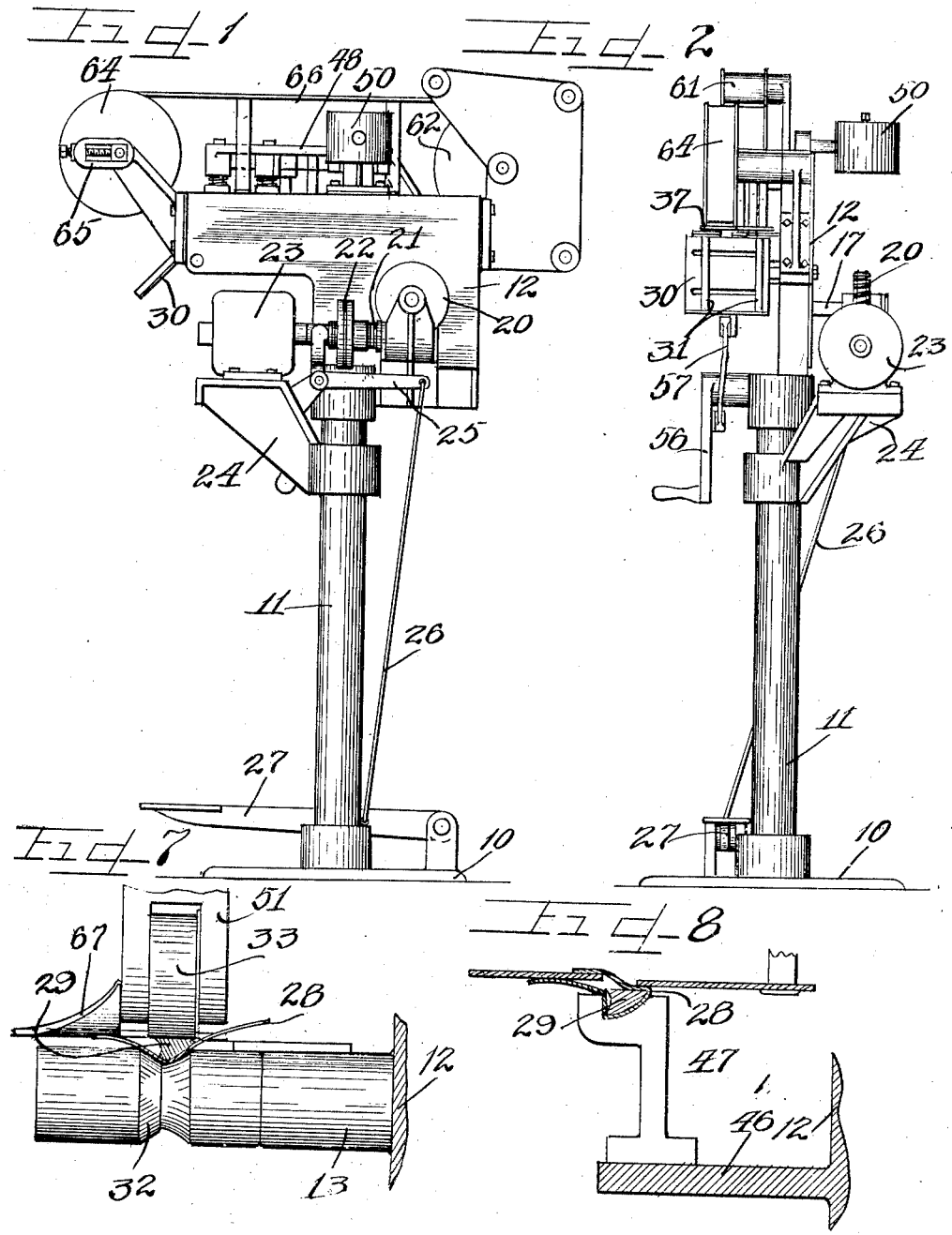

May 14, 1929.  E. HUTCHENS  1,712,618
CLINCHER TIRE BEAD FLIPPING MACHINE
Original Filed Dec. 5, 1924  4 Sheets-Sheet 2
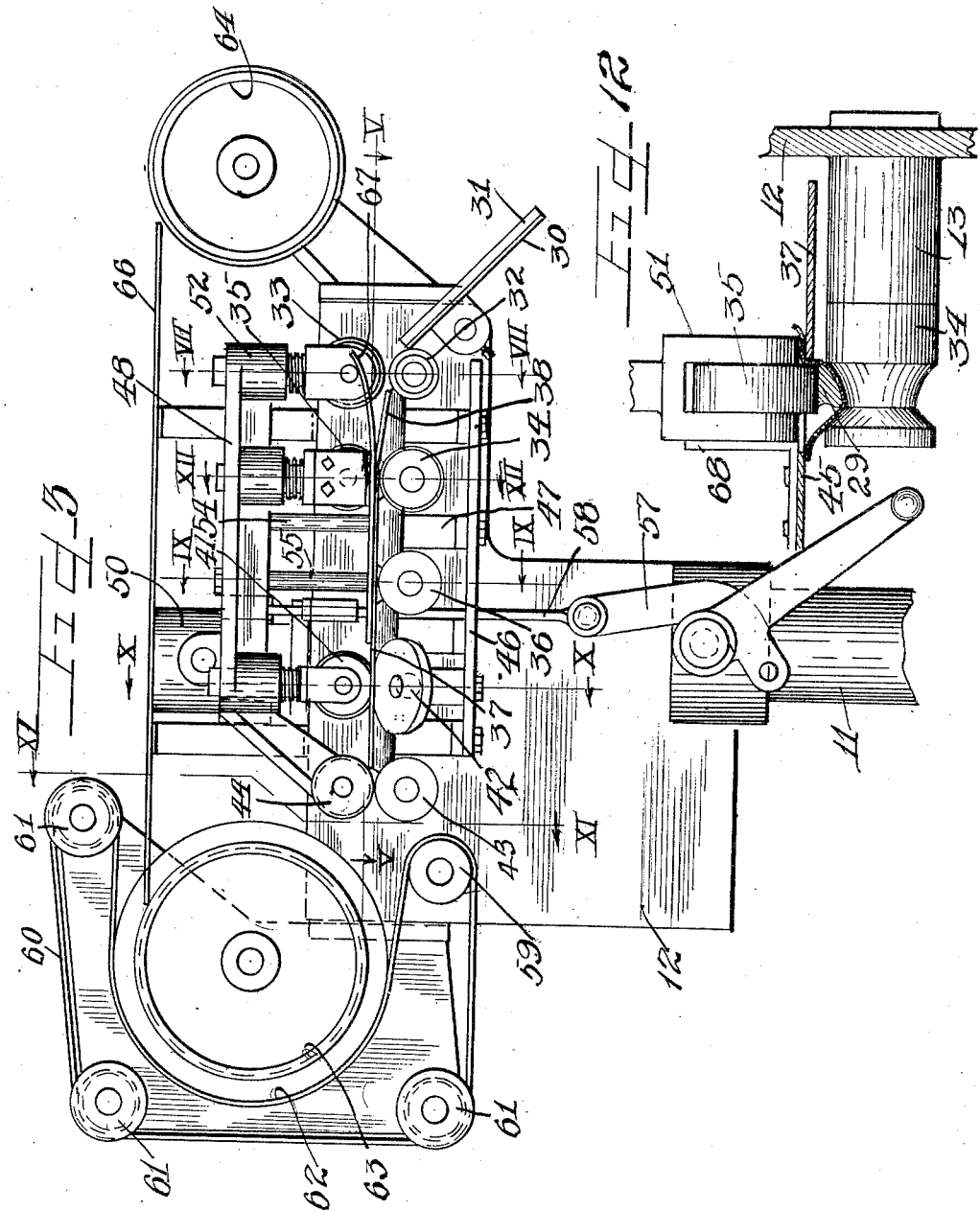
Inventor
Edward Hutchens
by Carlisle Niles
Attys.

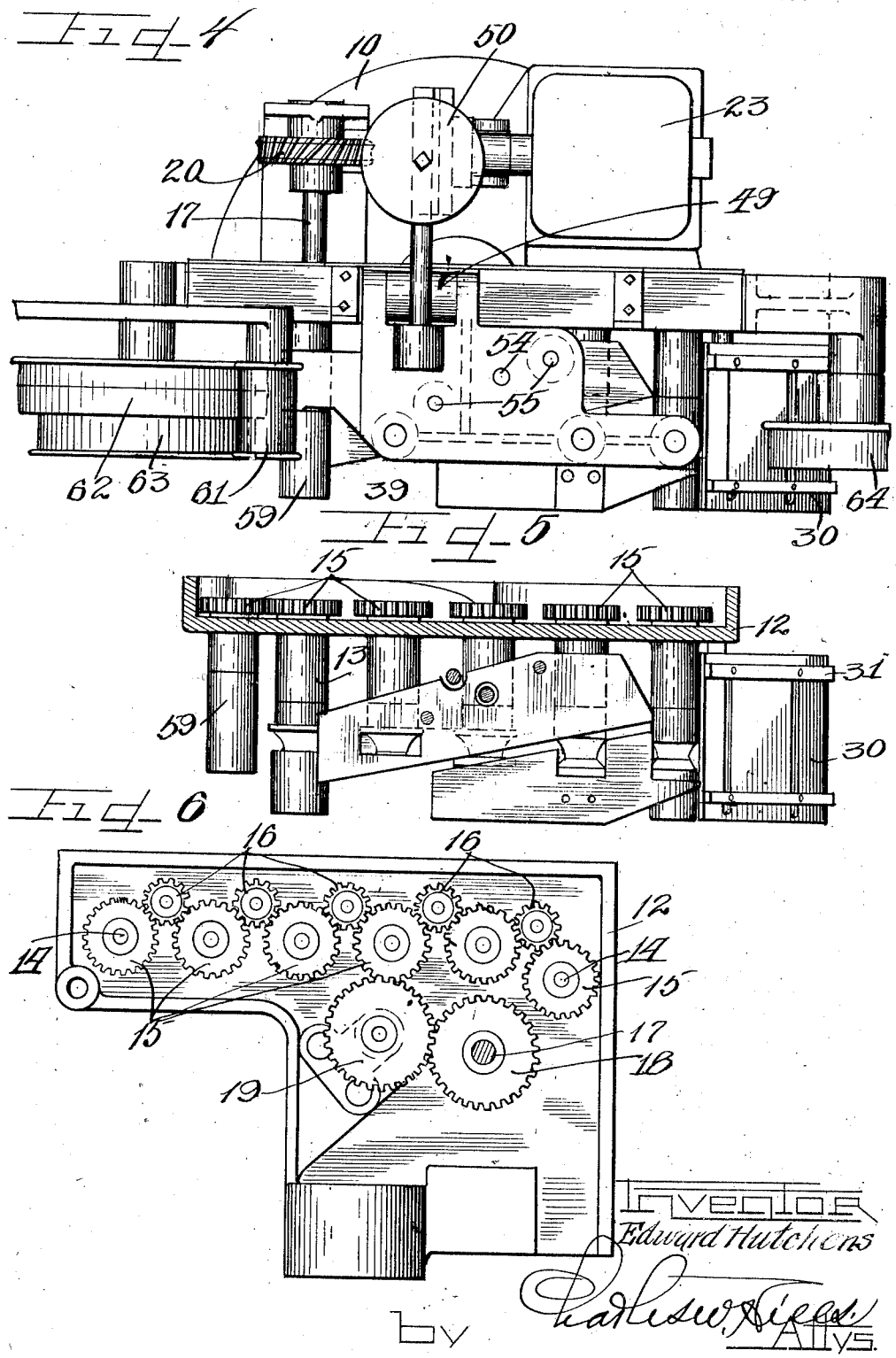

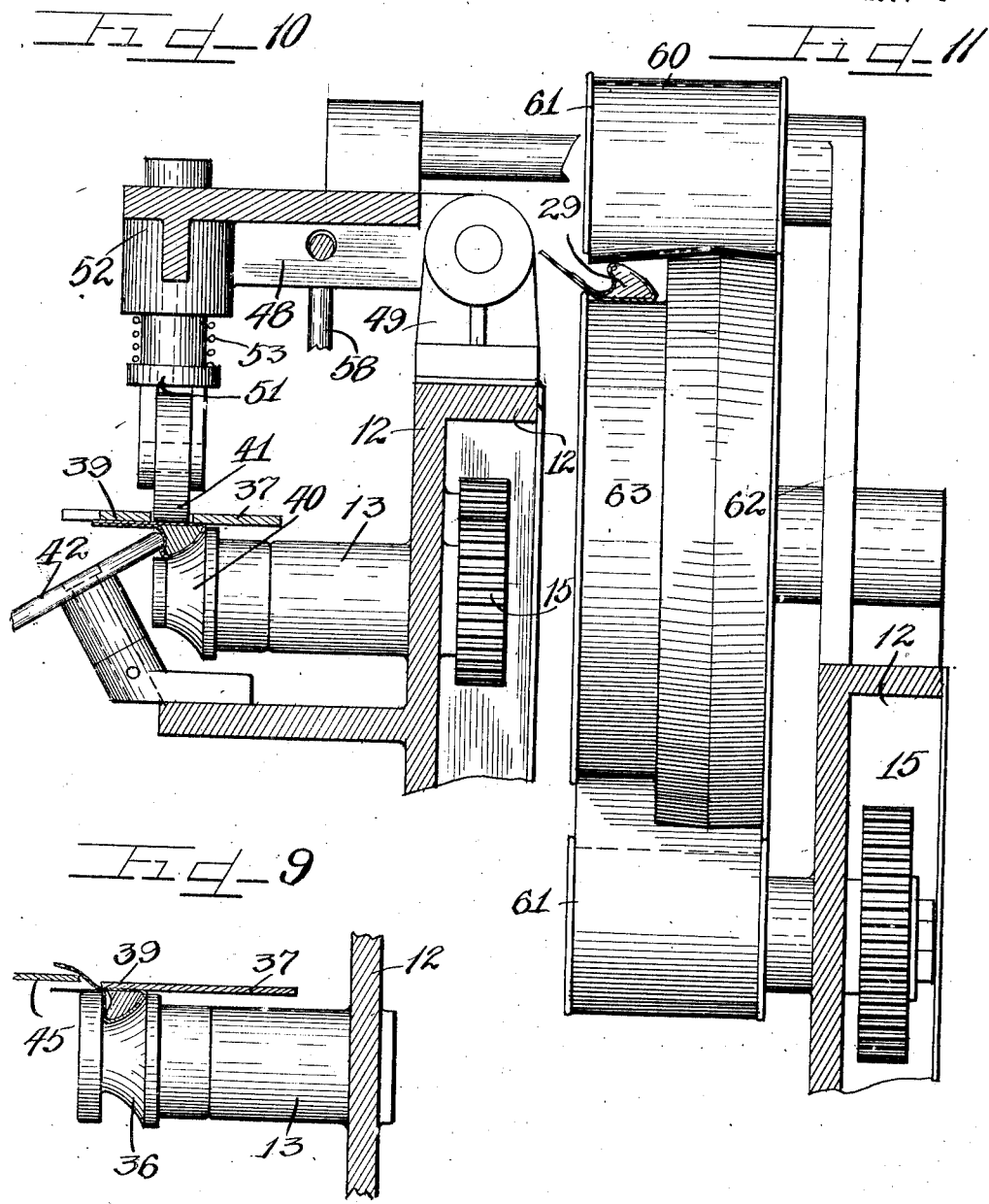

Patented May 14, 1929.

1,712,618

UNITED STATES PATENT OFFICE.

EDWARD HUTCHENS, OF MILWAUKEE, WISCONSIN.

CLINCHER-TIRE BEAD-FLIPPING MACHINE.

Application filed December 5, 1924, Serial No. 754,010. Renewed September 28, 1928.

This invention relates to a clincher bead flipping machine for assembling the beads used in the manufacture of pneumatic or other rim-mounted tires.

It is an object of this invention to provide an improved machine for automatically folding a fabric flipper strip about a bead filler especially one of the clincher type having a reentrant strip with smooth and continuous binding contact with the bead.

It is also an object of this invention to provide a machine of the class described having means for distorting and forming a flat ply of the fabric while folding it about a bead core, said means being readily separated to permit placement and removal of the finished bead.

It is a further object of this invention to provide a plurality of pairs of rollers adapted to apply the fabric to successive faces of the bead filler, said pairs of rollers being driven as a unit while being individually loaded to the desired pressure to insure the correct individual action.

It is another object of this invention to provide means for drawing the bead filler through the series of rollers at a speed corresponding thereto and to form a circuit for the continuous bead filler whereby the bead will be properly guided to the rollers permitting any number of passes therethrough, without imposing extra duties on the operator.

It is still another object of this invention to provide a simple and reliable means of placing the tire bead and fabric under uniform tension during its passage through the rolls to avoid bunching or folding of the fabric during application to the bead.

It is also an object of this invention to provide an improved automatic machine for applying flipper strips that will be economical to manufacture and simple in operation to allow the employment of unskilled labor to operate the same.

Other and further important objects of this invention will be apparent from the disclosures in the specification and drawings.

The invention (in a preferred form) is illustrated in the drawings and hereinafter more fully described.

On the drawings:

Figure 1 is a rear view of a complete machine embodying the features of this invention.

Figure 2 is a side view thereof.

Figure 3 is an enlarged front view of the operating mechanism of the machine.

Figure 4 is a top plan view thereof.

Figure 5 is a section on the line 5—5 of Figure 3, thus eliminating the upper series of idler rollers.

Figure 6 is a back view of the gear case with cover removed showing the roller driving mechanism.

Figure 7 is a section on the line 7—7 of Figure 3 showing the first pair of rollers.

Figure 8 is a section showing the supports for the tire bead between adjacent rollers.

Figure 9 is a section on the line 9—9 of Figure 3, showing the action of the plow in folding the fabric.

Figure 10 is a section on the line 10—10 of Figure 3 showing the forming of the reentrant portion of the bead.

Figure 11 is a section on the line 11—11 of Figure 3.

Figure 12 is a section on the line XII—XII of Figure 3.

As shown on the drawings:

The machine support chosen for illustration comprises a floor plate 10 and column 11 to the top of which is secured a plate or bracket 12 forming the backbone of the mechanism as a whole. A series of shaft bosses 13 are formed on the backbone and shafts 14 journalled therein carry duplicate gears 15 which are caused to rotate as a unit by intermeshing idler pinions 16. The entire train derives its motion from the shaft 17 carrying the gear 18 meshing with an idler gear 19 which in turn meshes with one of the gears 15. The shaft 17 carries a worm gear 20 driven by a worm and worm shaft 21 connected by a clutch 22 to a driving motor 23 supported on the column bracket 24. The clutch is actuated by a bell crank lever 25 connected by a tie rod 26 to a foot lever 27 pivoted to the floor plate 10 in a position convenient to the operator.

It will be convenient to describe the various details of the mechanism in the order that they affect the operations of wrapping a flat flipper strip 28 of the desired width about a tire bead or bead filler 29. The latter is customarily delivered to the machine spliced into an endless ring of a diameter or circumference to suit the tire it is to be built into, but the splicing operation may be performed during the process of applying the flipper strip, which may be previously cut to proper length or may be cut off by the operator at the finish of the wrapping operation. It is very important that this bead should not be stretched during the process.

The flipper strip is guided into proper contact with the bead by means of an apron 30 having adjustable shoulders 31 permitting the use of any width fabric and variation of the stagger or lap as desired. The bead and flipper strip are brought into initial contact at the rolls 32 and 33 the roll 32 being mounted on the first of the shafts 14 and grooved to conform to the shape of the bead which is pressed onto the fabric by the upper roll 33. The next pair of rolls 34 and 35 rub the fabric up to the point of the bead, forming the toe of the bead, the lower roll 34 being mounted on the second shaft 14 and being grooved in the same way as the roll 32. Due to the larger outer diameter of the roll 34, affording an increased depth of the groove therein and the speed of movement of the bead the peripheral inner edge of the roll groove rubs the tacky flipper strip into firm contact with the surface of the bead thus eliminating air bubbles and wrinkles in the fabric.

The third of the series of shafts 14 carries a roll 36 of the same general outline as the roll 34 except that the outer edge of the groove stands vertically to carry the fabric up to the level of the top of the roll and bead. A plow 37 comprising a flat plate is mounted above the plane of the rolls and its entering edge 38 is deflected downwardly so that it lies below the fabric and to the rear of the bead. An inclined edge 39 extends out over the roll 36 and serves to fold the fabric over the top of the bead, the plate extending over and being apertured for a fourth roll 40 and its follower 41 designed to hold the bead and flipper strip while a slightly inclined idler roll 42 forces the fabric into the reentrant side forming the rim hook in a clincher tire. A fifth par of rolls 43 and 44 serve to smooth out the overlapping edges of the flipper strip to insure a good bond therebetween. A second plate 45 is mounted above the rolls 32 and 34 outside the groove by a bracket 68 as shown in Figure 12 and its forward edge is bent upwardly as at 67 in Figure 3 to keep the two edges of the flipper strip separated until the roll 42 acts to bind the fabric in the reentrant portion of the bead, because of the tacky nature of the fabric.

A shelf 46 is formed on the front of the backbone 12 below the series of driven rolls 32, 34, etc., and serves to support the roll 42 and the plate 45. A plurality of trough-like members 47 are mounted on this shelf, between adjacent power driven rolls, and serve to support the bead and the flipper strip between successive operations.

The upper or idler rollers 33, 35, 41 and 44 are mounted in a bracket 48 pivoted in supports 49 on the top of the backbone 12, and the bracket is counterbalanced by an adjustably positioned weight 50. The three rollers 33, 35 and 41 are mounted in spindles 51 sliding in bosses 52 in the bracket 48 and are urged downwardly by the springs 53 to compensate for uneveness in the bead or fabric. The downward movement of the bracket 48 is limited by the stud 54 which comes to rest on one of the shaft bosses 13. The plow 37 is secured to the bracket 48 by means of the spacer bolts 55. It will thus be evident that an upward movement of the bracket 48 will remove all parts positioned above the bead and flipper strip and will therefore permit ready removal and replacement thereof. The bracket is pulled down into position by means of a crank 56, lever 57 and rod 58, the crank carrying the lever 57 past dead center to lock the mechanism in position. If desired the counterweight can be adjusted to cause the bracket to swing up whenever the crank 56 is turned to the release position.

The last of the series of bosses 13, shafts 14, and gears 15; the one on the left in Figures 3 and 5, is positioned slightly below the level of the remaining bosses and the shaft carries a wide-faced driving pulley 59. A belt 60 is trained over this pulley and passes over the three idler pulleys 61 intended to hold the belt against the larger step 62 of a double stepped pulley, the smaller step 63 of which carries the bead and encompassing flipper strip. The belt is considerably wider than the step 62 to overlap and contact the bead in the smaller step to draw the same along through the various operations to prevent creeping or bunching between stages. The belt also prevents stretching of the soft bead, which would spoil the same. From the step 63 the bead passes over an idler pulley 64 at the other side of the machine and thence back to the first pair of rolls 32 and 33. The position of this pulley may be altered to tension the bead to any desired extent by means of the adjustable bearing 65 shown in Figure 1. A supporting gutter 66 is provided to prevent sagging and stretching of the bead between the two pulleys.

The operation of the individual elements is believed to have been sufficiently brought out in the foregoing description so that a general description of the operation of the machine as a whole is believed to be sufficient. By releasing the crank 56 the bracket 48 and the parts associated therewith can be lifted away from the driven rolls and a strip or ring of bead filler placed over the pulleys 63 and 64, lying on the various driven rolls and intermediate supports. The flipper strip may be brought up over the guide to the first roll 32 either before or after placing the bead filler. Rotation of the crank 48 into locked position brings the idler rolls into operative position. Depressing the foot lever 27 engages the clutch and starts the lower rolls and belt pulley, commencing the operation. As the bead strip and fabric flipper pass through the rolls the fabric is folded over the surface of the bead as heretofore described, a single pass usually being sufficient for a complete bond between the two, although if the operator desires the bead and enveloping strip may be passed through the rolls for several complete revolutions of the bead, each passage tending to smooth out and increase the strength of the bond between the bead and flipper strip.

I am aware that numerous details of construction may be varied through a wide range without departing from the principles of this invention, and I therefore do not purpose limiting the patent granted otherwise than necessitated by the prior art.

I claim as my invention:

1. In a machine of the class described a plurality of upper and lower rolls, a folder above one of the lower rolls, means for driving the lower rolls in synchronism, and means for lifting the upper rolls and the folder away from the driven rolls at will.

2. A machine for placing a strip about a bead, comprising a plurality of rollers and means for driving the same, a tiltable carriage provided with rollers cooperating with the first mentioned rollers, and a folding plow extending angularly with relation to the axes of said rollers for correctly positioning the strip across the bead as it is fed through the rollers.

3. A machine for placing a strip about a bead, comprising a plurality of rollers and means for driving the same, a tiltable carriage provided with spring pressed rollers cooperating with the first mentioned rollers, and a folding plow extending angularly with relation to the axes of said rollers for correctly positioning the strip across the bead as it is fed through the rollers.

4. A machine for placing a strip about a bead comprising a series of rollers having grooves therein, means for driving said rollers, a pivotal carriage located above said series of rollers and having a series of spring pressed rollers cooperating with the first mentioned rollers, a folding plate carried by said carriage and extending at an angle to said rolls to guide one edge of the strip across the bead prior to rolling the strip into contact with the top of the bead and the other edge of the strip.

5. A machine for covering a bead with a strip comprising a series of rollers and means for driving the same, each of said rollers provided with a grove adapted to receive a bead, a tiltable carriage mounted above said rollers and a series of cooperating rollers carried thereby, a guide plate carried by said carriage and adapted to extend at an angle from the axis of the first roller toward the second roller, a guide bracket located in front of the first roller for correctly positioning the strip with regard to the bead and said rollers, the guide plate forcing the strip tightly about the bead as the strip and bead are passed between the two series of rollers.

6. A machine for securing a strip about a bead comprising a standard, a gear box mounted on said standard, a series of rollers extending from the gear box and means for driving the rollers, a tiltable carriage, spring-pressed rollers carried by said carriage, and cooperating with the first mentioned rollers, a guide plate extending angularly towards said rollers, a guide bracket for the strip, the guide plate and rollers forcing the strip correctly about the bead and pressing the same tightly as the strip and bead are run through the machine.

7. A machine for placing a strip about a bead comprising a standard, a member on said standard, a series of rollers supported by said member, means for driving the said rollers, said series of rollers provided with grooves for the reception of a bead, a tiltable carriage located above said rollers and provided with spring-pressed cooperating rollers, a guide plate carried by said carriage and extending angularly across the path of the bead and adapted to contact with the strip and force the same across the bead, and means for guiding the strip as it passes under the first two rollers.

8. A machine for covering a bead with a strip comprising in part a series of driven rollers provided with V-shaped groove, a series of idle rollers cooperating with said driven rollers, a guide plate extending angularly across the path of the bead and strip for correctly positioning the strip with relation to the bead, the last two driven rollers and their idlers tightly pressing the flipper strip about the bead, and guiding means located ahead of the series of rollers for correctly initially positioning the strip as it fed to a bead.

9. A machine for securing a strip about a tire bead comprising a series of rollers, all of which are provided with grooves, the grooves being arranged to force the flipper strip against the two sides of the bead upwardly, and a guide plate for forcing the strip across the top of the bead, a second series of rollers cooperating with the first mentioned rollers and mounted on a tiltable carriage, said second series cooperating with the first mentioned series, a guiding means positioned in front of the rollers for initially positioning the strip, and means for driving the rollers to thereby tightly force the strip about the bead.

10. A machine for enfolding a strip about a bead comprising a standard, an adjustable support on said standard, a plurality of rollers having grooves formed therein mounted in said support, a tiltable carriage mounted on said support and means for tilting the same, a plurality of spring-pressed rollers carried by said carriage and cooperating with said first mentioned rollers, a folding plate positioned above said guide block and extending diagonally across the path of the bead to force said strip across and on the upper surface of said bead, means arranged in front of the rollers for initially positioning the strip with regard to the bead, and means for driving the rollers to thereby tightly press the strip about the bead.

11. A machine for placing a strip about a bead comprising a plurality of rollers and means for driving the same, a tiltable carriage provided with rollers cooperating with the first of said mentioned rollers, a guide block positioned between two of the first mentioned series of rollers and a guide plate positioned above said guide block and extending angularly with relation to the axes of said rollers for correctly positioning the strip across the bead as it is fed through the rollers.

12. A machine for placing a strip about a bead comprising a plurality of rollers provided with a V-shaped groove and a guide block also provided with a V-shaped groove extending between said rollers, said guide block extending in a plane at its rear above the plane of the forward edge, means for driving said rollers, a tiltable carriage provided with spring-pressed rollers cooperating with the first mentioned rollers, a guide plate carried by said carriage for guiding the top of the strip across the bead, as the strip and bead are passed between the said rollers.

13. A machine for covering a bead with a strip comprising a series of rollers and means for driving the same, each of said rollers provided with a groove adapted to receive a bead, a correspondingly grooved guide block having its rear edge elevated above its front edge, a tiltable carriage mounted above said rollers and a series of cooperating rollers carried thereby, a guide plate carried by said carriage and adapted to extend at an angle from the axis of the first roller toward the second roller, a guide bracket located in front of the first roller for correctly positioning the strip with regard to the bead and said rollers, the guide block and guide plate forcing the strip tightly about the bead as the strip and bead are passed between the two series of rollers.

14. A machine for placing a strip about a bead comprising a standard, a member on said standard, a series of rollers supported by said member, means for driving the said rollers, said series of rollers extending in a horizontal plane, said rollers provided with a V-shaped groove for the reception of a bead, a guide block positioned between the first two of said rollers and also provided with a V-shaped groove registering with the groove in the rollers, a tiltable carriage located above said rollers and provided with spring-pressed cooperating rollers, a guide plate carried by said carriage and extending from without the path of the first roller to across the path of the second roller and adapted to contact with the strip and force the same across the bead, means for guiding the strip as it passes under the first two rollers, and said bead being completely covered before reaching the second series of rollers.

15. A machine for covering a bead with a strip comprising in part a series of driven rollers provided with a V-shaped groove, a series of idle rollers cooperating with said driven rollers, a guide block located between two of the driven rollers having a V-shaped groove registering with the grooves of the rollers and the rear portion of the block extending in a plane above the front portion thereof, an adjustable guide plate extending angularly across the path of the bead and strip for correctly positioning the strip with relation to the bead, the last two driven rollers and their idlers tightly pressing the flipper strip about the bead, and guiding means located ahead of the series of rollers for correctly initially positioning the strip as it is fed to the bead.

16. In a machine for placing a strip about a bead, upper and lower sets of means for pressing the strip into contact with the bead and means positioned in a horizontal plane between said upper and lower sets of pressing means, for progressively folding one edge over one side of the bead so as to bring said edge in a position where it can cooperate with the other edge of the strip to form a skirt.

17. In a machine for placing a strip about a bead, means for pressing the strip into contact with the bead, means positioned between said pressing means for progressively folding one edge over on one side of the bead so as to bring said edge in a position where it can cooperate with the other edge of the strip to form a skirt, and means for preventing stretching of the covered portion of said bead as it leaves said pressing means.

18. In a machine for placing a strip about a bead, upper and lower sets of means for pressing the strip into contact with the bead, and means positioned in a horizontal plane between said upper and lower sets of pressing means for progressively folding one edge over one side of the bead so as to bring said edge in a position where it can cooperate with the other edge of the strip to form a skirt, said folding means including a guide plate having an edge cut at an angle to the line of movement of the strip passing between the sets of pressing means.

19. In a machine for placing a strip about a bead, folding means including a guide plate for pressing the strip to one side of the bead, means for progressively folding one edge of said strip on a diagonal over a second side of said bead to a position wherein said edge can cooperate with the other edge of said strip, and roller means for pressing said other edge of said strip into engagement with a third side of said bead and into cooperation with said first mentioned edge of the strip.

20. In a machine for placing a strip about a bead, folding means including a guide plate having an edge cut at an angle to the line of movement of the strip for progressively folding one edge of a strip on a diagonal over a side of said bead to a position wherein said edge can cooperate with the other edge of said strip and means for pressing said cooperating edges of the strip into engagement with each other so as to cover another side of said bead.

In testimony whereof I have hereunto subscribed my name.

EDWARD HUTCHENS.